Inventors
William C. Sealey
Fritz W. Arend
by Harold A. Silver
Attorney

Patented May 3, 1949

2,468,786

UNITED STATES PATENT OFFICE 2,468,786

ELECTROMAGNETIC CORE ASSEMBLY AND METHOD

William C. Sealey, Wauwatosa, and Fritz W. Arend, West Allis, Wis., assignors to Allis-Chalmers Manufacturing Company, Milwaukee, Wis., a corporation of Delaware Application August 21, 1944, Serial No. 550,358

6 Claims. (Cl. 175—356)

This invention relates in general to electromagnetic cores and particularly to an improved core assembly for induction apparatus having substantially radial laminations and to an improved method of assembling such core.

Prior art cores for induction apparatus have been made substantially cylindrical in shape and have been formed of laminations extending substantially radially and longitudinally of the cylinder. In order that laminations of uniform thickness throughout their radial length may be used, sectors of the core, substantially triangular in cross section, have been formed of laminations having progressively decreasing radial length. When these sectors were assembled to form a cylindrical core, thermo-setting varnish has been used in an attempt to hold the laminations in place during the assembling operation. This method of assembling these cores had the disadvantage of permitting relative movement of the various laminations during assembly and operation. Welding of the laminations has been avoided so as to eliminate the flow of eddy currents through the welds in the laminations.

It is therefore an object of the present invention to provide a core assembly and method of assembling the same that will avoid the above disadvantages.

It is also an object of the present invention to provide an improved core assembly and method involving radial laminations in which packages of laminations are welded or otherwise fusibly united together without effecting increased eddy current losses.

It is a further object of the present invention to provide an improved core structure and method in which the laminations can be easily welded at low welding currents and without deformation or burning of the thin laminations.

It is also an object of the present invention to provide a core assembly and method in which the laminations are welded in an improved manner so that packages of the laminations can be assembled with insulation therebetween to form an improved cylindrical core with the laminations extending substantially in a radial direction.

Objects and advantages other than those above set forth will be apparent from the following description when read in connection with the accompanying drawing, in which.

Figure 1:
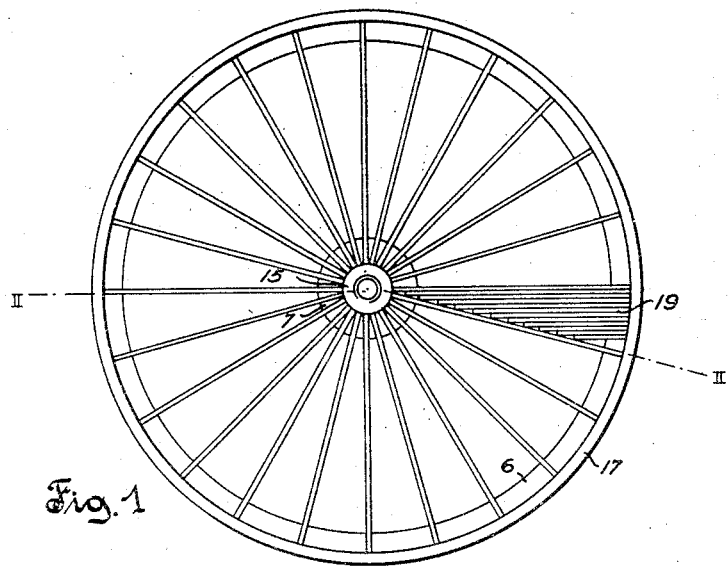
Fig. 1 is a top view of a core assembly embodying the present invention.
Figure 2:
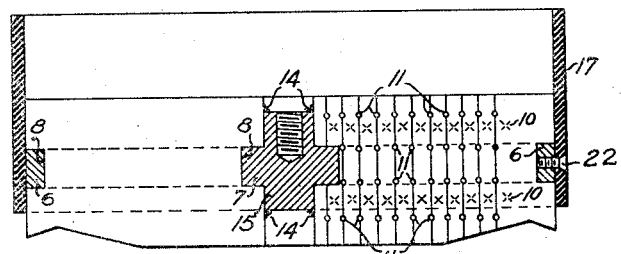
Fig. 2 is a section view taken on the lines II—II of Fig. 1.

The core assembly as shown in Figs. 1 and 2 is substantially cylindrical and is formed of a plurality of sectors 19, in which the laminations of sheet core material are substantially radial. In Fig. 1 only one core sector 19 is shown with the laminations in place, for the other sectors would be similar if assembled. Each sector 19 is made up of a plurality of packages 18 of laminations as shown more in detail in Fig. 3. Each package 18 is made up of a group of laminations 5 of one length and one lamination 9 of a longer length. The groups of laminations 5 of one length as shown in Fig. 3 contain three laminations, however, this number may be increased or decreased as desired.

Figure 3:
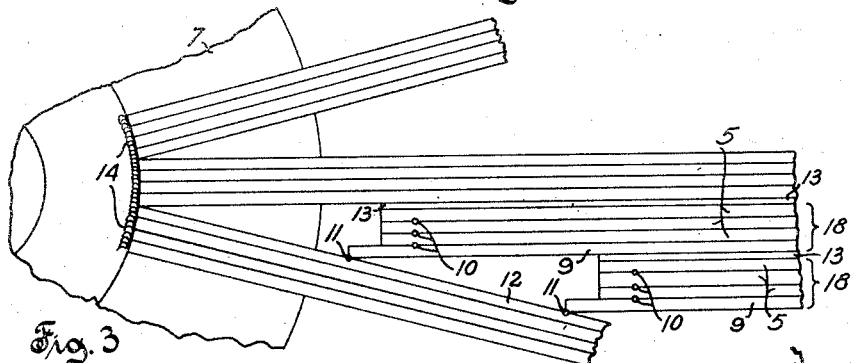
Fig. 3 is a partial enlarged view of the core structure shown in Fig. 1.

The packages 18 of laminations may be fusibly united as by spot welding as at 10 in Fig. 3. These packages of laminations are then spot welded, starting with the shortest package 18, to a common supporting lamination 12 which will become one of the laminations in the longest group of the adjacent sector 19. This weld is shown at 11 and can be made with very little current as only two thin laminations are involved. With low current there is no deformation of the material and no burning. The package 18 of laminations can be easily held in place and several of these welds 11 are made to hold one package as shown in Fig. 2. As the packages 18 are assembled, a layer of insulation such as paper 13 is placed between adjacent packages.

When the welded packages of one sector 19 are assembled and held together by the above method, this incomplete sector is put in place as shown in Figs. 1 and 2 with the inner notch 8 in the supporting lamination cooperating with a collar 7 on the central hub 15. As shown in Fig. 3, the sector is completed by a stack of unwelded laminations of the same size as the supporting lamination and by the supporting lamination of the following sector. Each sector is then welded to the hub 15 as at 14. When the entire core is assembled an outer ring 6 is placed in the outer notches 8 and an insulating tube 17 is then placed around the edges of the circumferential edge of the core. This tube 17 is held in place by a screw 22 threaded into the ring 6.

The core assembly thus forms a rigid assembly utilizing radial laminations but in which no additional eddy current path is formed because of the welded structure. Inasmuch as the welds are along one radial edge of a sector and one end of a sector, and the sheets of core material are otherwise in contact only through their insulating surfaces, no path for eddy currents is made by the welds.

Figure 4:
Fig. 4 shows a modified form of the invention as shown in Fig. 3.

Fig. 4 shows a modification of the structure shown in Fig. 3 in which the longer lamination 29 of a package 28 is of the same length as the laminations 5 in the next longer package 28. This core assembly utilizes the same method of assembly above described in reference to Fig. 3 with an additional advantage of using a smaller number of different size laminations. The packages 28 may be formed by arc welding as shown at 20 or by spot welding as at 10 in the packages 18 in Fig. 3. The packages are then assembled one at a time, beginning with the shortest package, by a low current spot weld 11 on the lamination 12. Insulation such as the paper 13 is inserted between the packages while being assembled.

In some core assemblies made in accordance with the above invention it may be sufficient to fasten the shorter laminations 5 together in the packages by means of thermosetting material and assemble the core by welding or otherwise fusibly uniting the longest laminations to the inner supporting ring 7 as at 14 or to the outer supporting ring 6.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A core assembly of laminations of sheet metal extending substantially radially about a longitudinal axis, said core assembly comprising a plurality of sectors, certain of said sectors comprising a plurality of stacked packages of said laminations, adjacent said packages being non-uniformly spaced from said axis to define a series of steps, each said package comprising a stack of laminations which are at a substantially uniform distance from said axis and a single lamination extending to a smaller distance from said axis to define a protruding edge, said protruding edges lying substantially parallel to said axis, said edges resting on a common supporting lamination of an adjacent said sector, and bonds of fused metal uniting certain of said packages with said supporting lamination at intermediate points of the lines of contact of said edges with said supporting lamination.

2. A core assembly of laminations of sheet metal extending substantially radially from a central member having a longitudinal axis, said core assembly comprising a plurality of sectors, certain of said sectors comprising a plurality of stacked packages of said laminations, adjacent said packages being non-uniformly spaced from said axis to define a series of steps, each said package comprising a stack of laminations which are at a substantially uniform distance from said axis and a single lamination extending to a smaller distance from said axis to define a protruding edge, said protruding edges lying substantially parallel to said axis, said edges resting on a common supporting lamination of an adjacent said sector, bonds of fused metal uniting certain of said packages with said supporting lamination at intermediate points of the lines of contact of said edges with said supporting lamination, and another bond of fused metal uniting said supporting lamination with said central member.

3. A core assembly of laminations of sheet metal extending substantially radially about a longitudinal axis, said core assembly comprising a plurality of sectors, certain of said sectors comprising a plurality of stacked packages of said laminations, adjacent said packages being non-uniformly spaced from said axis to define a series of steps, each said package comprising a stack of laminations which are at a substantially uniform distance from said axis and a single lamination extending to a smaller distance from said axis to define a protruding edge, said protruding edges lying substantially parallel to said axis, said edges resting on a common supporting lamination of an adjacent said sector, bonds of fused metal uniting certain of said packages with said supporting lamination at intermediate points of the lines of contact of said edges with said supporting lamination, and further bonds of fused metal uniting each lamination of said certain packages with each adjacent lamination of the same package.

4. A core assembly of laminations of sheet metal extending substantially radially from a central member having a longitudinal axis, said core assembly comprising a plurality of sectors, certain of said sectors comprising a plurality of stacked packages of said laminations, adjacent said packages being non-uniformly spaced from said axis to define a series of steps, each said package comprising a stack of laminations which are at a substantially uniform distance from said axis and a single lamination extending to a smaller distance from said axis to define a protruding edge, said protruding edges lying substantially parallel to said axis, said edges resting on a common supporting lamination of an adjacent said sector, bonds of fused metal uniting certain of said packages with said supporting lamination at intermediate points of the lines of contact of said edges with said supporting lamination, another bond of fused metal uniting said supporting lamination with said central member, and further bonds of fused metal uniting each lamination of said certain packages with each adjacent lamination of the same package.

5. In a method of assembling metal sheets to form one of a plurality of core sectors radially disposed about a longitudinal axis in which a plurality of packages of parallel laminations are stepped radially with an edge of one lamination of each package protruding inwardly from the package, the steps of fusibly joining the laminations of each package into a unitary structure, stacking said packages one by one, beginning with the outermost said package, in the relative positions of said packages in said core with said protruding edges thereof resting in substantially parallel relation on a common supporting lamination and said parallel laminations making with said supporting lamination an angle equal to the intended angle of the completed sector, and fusibly uniting the said protruding lamination of each said package and said supporting lamination at the line of contact of said edge with said supporting lamination prior to stacking the next succeeding package.

6. In a method of assembling metal sheets to form one of a plurality of core sectors radially disposed about a longitudinal axis in which a package of parallel laminations is disposed radially with an edge of one lamination protruding inwardly from the package, the steps of fusibly joining the laminations of said package into a unitary structure, disposing said package with said protruding edge resting on a supporting lamination and said parallel laminations making with said supporting lamination an angle equal to the intended angle of the completed sector, and fusibly uniting said protruding lamination and said supporting lamination at the line of contact of said edge with said supporting lamination.

WILLIAM C. SEALEY.
FRITZ W. AREND.

REFERENCES CITED

The following references are of record in the file of this patent:

UNITED STATES PATENTS

| Number | Name | Date |
|---|---|---|
| 2,114,070 | Bouwers | Apr. 12, 1938 |
| 2,359,102 | Foster | Sept. 26, 1944 |

FOREIGN PATENTS

| Number | Country | Date |
|---|---|---|
| 27,873 | Sweden | Aug. 8, 1908 |
| 111,716 | Germany | July 9, 1900 |
| 482,771 | Great Britain | Apr. 5, 1938 |
| 504,328 | France | Apr. 12, 1920 |
| 595,363 | France | July 13, 1925 |